United States Patent
Young et al.

[19]

[11] Patent Number: 5,997,225
[45] Date of Patent: Dec. 7, 1999

[54] ROTARY POWER TOOL WITH REMOTELY ACTUATED CHUCK

[75] Inventors: Gary L. Young; Thomas E. Durham, both of Six Mile; Mark S. Huggins, Clemson; Christopher K. Muhammad, Pendleton, all of S.C.

[73] Assignee: Power Tool Holders Incorporated, Wilmington, Del.

[21] Appl. No.: 09/196,965

[22] Filed: Nov. 20, 1998

[51] Int. Cl.⁶ .................................. B27C 5/10; B23B 5/22
[52] U.S. Cl. ................. 409/182; 144/136.95; 144/154.5; 144/371; 279/2.16; 279/43; 279/50; 279/158; 279/104
[58] Field of Search ......................... 409/182; 144/134.1, 144/136.1, 136.95, 135.2, 154.5, 371; 279/2.1, 2.16, 43, 50, 58, 141, 158, 904, 57; 408/104

[56] References Cited

U.S. PATENT DOCUMENTS

| | | |
|---|---|---|
| 425,224 | 4/1890 | Hartness ..................................... 279/57 |
| 658,473 | 9/1900 | Smith et al. ............................... 279/57 |
| 2,353,966 | 8/1944 | Panza et al. . |
| 2,370,729 | 9/1945 | Hoppe . |
| 2,466,651 | 4/1949 | Zagar . |
| 2,655,826 | 10/1953 | Goldsby . |
| 3,095,205 | 6/1963 | Farnsworth . |
| 3,724,563 | 4/1973 | Wickham et al. . |
| 3,811,361 | 5/1974 | Seely et al. . |
| 5,188,492 | 2/1993 | McCracken ........................... 144/154.5 |
| 5,743,539 | 4/1998 | VanderPol et al. ........................ 279/58 |

*Primary Examiner*—W. Donald Bray
*Attorney, Agent, or Firm*—Dority & Manning

[57] ABSTRACT

A rotary power tool, such as a router, includes an actuating device engaged with a chuck device to move the chuck device between its gripping and release positions. The actuating device includes a lever member that extends axially relative to a casing of the power tool within an inner circumference of a base member. This lever member is movable relative to the casing and is engaged with the chuck so that movement of the lever is imparted to the chuck device causing the chuck device to move axially between its gripping and release positions.

20 Claims, 5 Drawing Sheets

ROTARY POWER TOOL WITH REMOTELY ACTUATED CHUCK

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521,895. U.S. patent application Ser. No. 09/067,569 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is therefore a principal object of the present invention to provide a power rotary tool that incorporates a mechanism for remotely actuating a chuck, in particular a quick-change chuck, for any manner of power tool.

An additional object of the present invention is to provide a mechanism for safely changing out tool bits in rotary power tools wherein the operator's hands are totally removed from the cutting area of the tool bit.

And still a further object of the present invention is to provide a mechanism for remotely actuating chucks on rotary power tools so that actuation of the chuck is no longer limited by manual hand strength.

And still a further object of the present invention is to provide a actuation mechanism for quick-change chucks that is particularly suited for high speed routers.

Additional objects and advantages of the invention will be set forth in part in the following description, or may be obvious from the description, or may be learned through practice of the invention.

In accordance with the objects and purposes of the invention, a rotary power tool is provided having a remotely actuated chuck device mounted on the end of a rotatable drive spindle that is housed in a casing. The rotary power tool will be described herein as a router. However, it should be appreciated that the present invention is not limited to any particular rotary power tool, and has application wherever it may be desired to remotely actuate a quick-change type of chuck, for example with power drills, drill presses, lathes, milling machines, sanders, grinders, and the like.

It should also be appreciated that the present invention is not limited to any particular type of chuck device and, in this regard, the internal working mechanism of the chuck device is not particularly important to the invention or necessary for an understanding of the invention. It is intended that the present invention be utilized with any manner of chuck device that is actuated between a gripping and release position by axial movement of a member of the chuck device, such as an outer sleeve member.

The rotary power tool, for example a router, according to the invention may include a base member that is concentric on the casing. As with conventional routers, the base member comprises a variably positionable upper working surface that establishes a working position of the tool held by the chuck device relative to a work piece. The base is rotatably advanceable on the casing for changing positions of the working surface relative to an axis of the drive spindle. With routers, this arrangement of the base is conventionally referred to as a fixed-base router.

An actuating device is operably engaged with the chuck device to move the chuck device between the gripping and release positions. In the embodiment wherein the chuck device includes an axially movable sleeve, the actuating device is preferably engaged with the outer sleeve member of the chuck. The actuating device further comprises a lever member extending axially relative to the casing within an inner circumference of the base member. This lever member is movable relative to the casing to move the chuck device between the gripping and release positions while permitting the base to freely rotate relative to the casing without interference from the lever member.

In one preferred embodiment of the invention, the actuating device comprises a radially extending arm or member engaged with the chuck device at one end, for example within a groove defined in an outer circumferential surface of the chuck's outer sleeve, and engaged with the lever member at an opposite end. The lever member in this embodiment is movable axially along the casing to move the radially extending member, thereby imparting axial movement to the member which is in turn imparted to the chuck device or chuck sleeve. In this embodiment, the lever member may be disposed within an axially extending channel defined in an outer circumferential surface of the casing. The channel has a radial depth so that the lever member does not extend radially beyond the outer circumference of the casing. In this way, the lever member does not impede rotation of the base relative to the casing in any way.

The lever member is operationally configured or linked with the radially extending member in any conventional manner so that axial movement of the lever is imparted to the chuck device through the radially extending member. For example, in one embodiment, the radially extending member is pivotally attached to the end of the lever member through an intermediate member. This arrangement is particularly useful when the radially extending member is also pivotally mounted to the tool casing such that axial movement of the lever member causes the radially extending member to pivot in an axial plane relative to the drive spindle. This axial movement of the radially extending member is then imparted to the chuck device, for example by pin members or other engaging members contacting the chuck device.

An actuating arm member may also be configured with the lever member at an end thereof generally opposite from the radially extending member. In this embodiment, the actuating arm member may be movable in any plane in order to impart axial movement to the lever member. For example, in one embodiment the actuating arm member is rotatable relative to the lever member and a joint mechanism, such as a ball joint, is operably disposed between the actuating arm member and the lever member to convert rotational movement of the actuating arm member to axial movement of the lever member. In an alternative embodiment, the actuating arm member may be pivotal relative to the lever member, and a joint mechanism may be disposed between the actuating arm member and the lever arm to convert pivotal movement of the actuating arm to axial movement of the lever member. And in still an alternative preferred embodiment, the actuating arm member may be rigidly fixed relative to the lever member so that the actuating arm member must be moved axially in order to move the lever arm axially.

In still an alternative preferred embodiment, the lever member may extend within an inner circumferential surface of the casing, particularly if there is room between the motor and the casing. In this embodiment, a device is provided to move the lever member, such as an actuating arm configured on the end of the lever generally opposite from the chuck device which extends from the lever through an opening in the casing. The lever member is guided axially within the casing by any conventional guiding device, such as a tongue-in-groove or dovetail arrangement, engaging pins, etc.

In an alternative preferred embodiment, the actuating device comprises a pivotally mounted radially extending member engaged with the chuck device at one end and engaged with the lever member at an opposite end. The lever member is rotatable relative to the radially extending member, and a joint mechanism is configured between the lever member and the radially extending member to convert rotational movement of the lever member to pivotal movement of the radially extending member. In this embodiment, the chuck device may comprise an outer axially movable sleeve member, and the radially extending member is engaged at one end thereof with the sleeve member. The lever member may rotate relative to the radially extending member in an axially extending channel defined in the tool casing. In other words, instead of moving axially within a channel in the casing, in this embodiment the lever member would move generally across the width of an axially extending channel as it is rotated at one end thereof.

It may be preferred to also include a locking mechanism in order to lock the lever member in position to ensure that the chuck device remains at all times in its gripping position.

Although the present invention is described generally with regards to a router, it should be appreciated that the invention has much broader aspects and can be incorporated in a number of conventional power tools, and that all such aspects are within the scope and spirit of the invention.

The invention will be described below in greater detail with reference to the figures.

DETAILED DESCRIPTION

Figure 1:
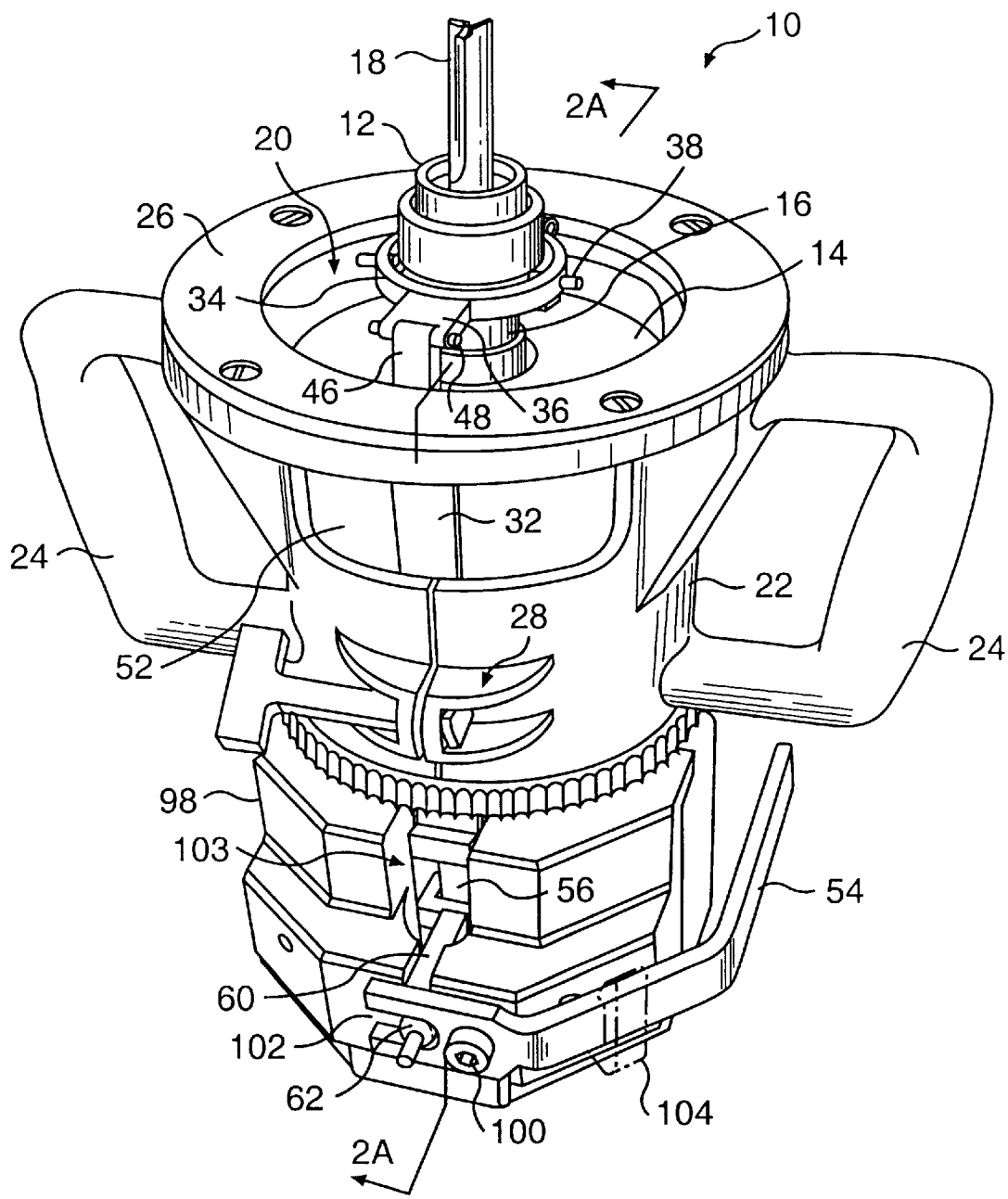
FIG. 1 is a perspective view of a rotary power tool, particularly a router, according to the present invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a third embodiment. It is intended that the present invention include such modifications and variations as come within the scope and spirit of the present invention.

The present invention relates to power tools in general. For example, referring to the figures, power tool 10 is illustrated as a conventional router. The particularly illustrated router is conventionally known as a "fixed-base" router wherein the base member 22 is axially movable or positionable by rotating the base 22 relative to the motor casing 14. This type of router is well known to those skilled in the art. Additional routers that are just as applicable (but not illustrated) include plunge style routers wherein the base moves axially along plunge rods or arms. This type of router is also well known to those skilled in the art.

It should be appreciated that the present invention is not limited to any particular type of power tool, particularly any type of router. The invention has distinct advantages as it pertains to a fixed-base router, as will be described in greater detail below, but this is not meant as a limitation of the invention. The present invention relates to any manner of power tool wherein it is desired to remotely actuate a chuck between gripping and release positions, including power drills, drill presses, lathes, milling machines, sanders, and the like.

The rotary power tool 10 according to the invention includes a chuck device, generally 12, for holding a tool 18. For example, in the embodiment of the power tool illustrated in the figures, chuck 12 holds a router bit 18. It should be appreciated that the type of chuck 12 is not particularly important to the invention. The present invention applies to any manner of chuck, for example the chucks described and illustrated in the patents and applications discussed above, wherein the chuck 12 is actuated through axial movement relative to a body member or drive spindle 16 of the power tool. For example, chuck 12 may be actuated by axial movement of an outer sleeve member 94 relative to the drive spindle. There are a number of sleeve actuated chuck devices known to those skilled in the art and the particular operation of chuck 12 is not necessary for an appreciation or understanding of the present invention. Chuck 12 will thus not be described in detail herein. One particular type of chuck for which the present invention is particularly applicable is illustrated and described in U.S. Pat. No. 5,810,366 and U.S. patent application Ser. No. 09/067,569, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member surrounds the gripping segments. The gripping segments are compressed radially inward upon axial movement of the sleeve member to a gripping position to grip upon a tool shank inserted into the bore. The tool is released when the gripping segments move to a release position upon opposite axial movement of the sleeve.

A chuck 12 useful in the present invention includes some structure or mechanism, such as sleeve 94 having a circumferential groove 96 or annular ridge (not illustrated) defined therein, for engagement with a sleeve actuating device, generally 20. Circumferential groove 96 or the like may be formed as an integral component of sleeve 94 or, in an alternative embodiment, an additional outer sleeve or ring member defining the circumferential groove 96 may be fitted onto sleeve member 94. This embodiment may be particularly useful in retrofitting the present invention to existing power tools and chucks.

Referring again to the figures in general, rotary power tool 10 includes a casing 14 housing the rotationally driven drive spindle 16. Casing 14 is also the housing member for the drive spindle motor (not illustrated).

The router embodiment of power tool 10 illustrated in the figures is a fixed-base router and base 22 is axially advanceable relative to casing 14 by rotating base 22 relative to the casing. Upon rotation of base 22, working surface 26 is axially positioned to establish a working position of tool 18 held by chuck device 12 relative to a work piece. The operation of the base member is conventional and known to those skilled in the art. In general, an operator releases locking device 28 of base member 22 and adjusts the base member by rotating handles 24 causing the base member to move axially relative to casing 14.

Figure 4:
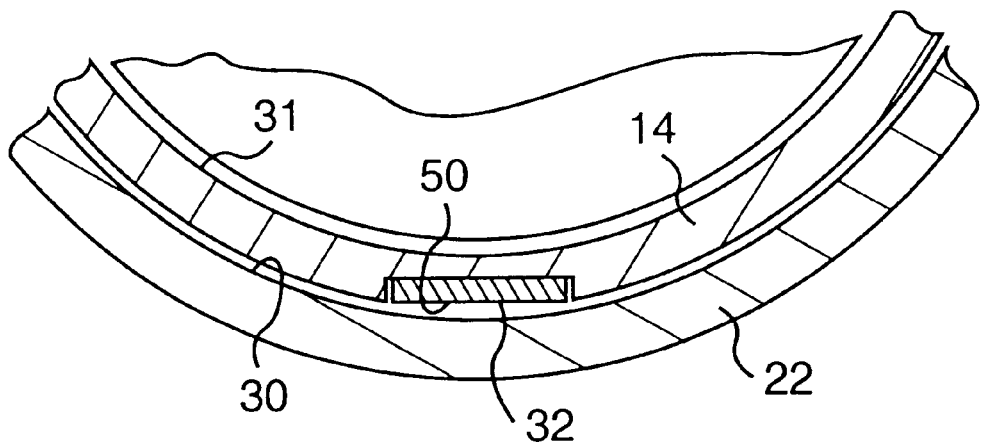
FIG. 4 is an enlarged cross-cut view particularly illustrating the lever member disposed within a longitudinally extending channel defined in the casing.
Figure 5:
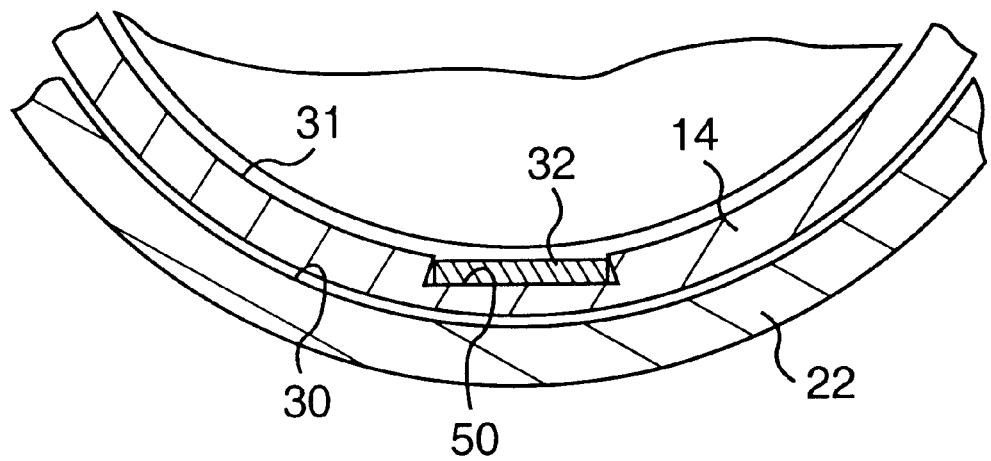
FIG. 5 is an enlarged cross-cut view of an alternative embodiment of the lever member disposed within the casing.

Actuating device 20 according to the invention further includes a lever member or mechanism, generally 32, that extends axially relative to casing 14 within an inner circumference 30 of base 22. Lever member 32 is movable relative to casing 14 so as to move the chuck device 12 between the gripping and release positions without interfering with the rotational movement of base 22 relative to casing 14. Lever 32 can be disposed in a number of ways so as not to interfere with rotational movement of base 22. For example, FIG. 4 illustrates an embodiment wherein lever member 32 is disposed within an axially extending channel 50 defined in the outer circumferential surface 30 of casing 14. Channel 50 has a width and depth so as to accommodate the width and depth of lever member 32. FIG. 5 illustrates an alternative embodiment wherein channel 50 is defined on an inner circumferential surface 31 of casing 14. In this embodiment, channel 50 has a dove-tail profile so as to lock and guide lever member 32 therein. This type of profile, or a similar engaging profile, may be used on any of the embodiments of the invention.

Actuating device 20 according to the invention can comprise a number of mechanical variations. For example, referring to FIGS. 1 and 2 in particular, actuating device 20 includes a radially extending member or arm, generally 34, that is engaged with chuck device 12 and with lever member 32 at an end 36 thereof. In the embodiment illustrated, radially extending member 34 comprises a yoke-like member that is engaged with chuck device 12 by way of pins 38 extending through the yoke structure and into circumferential groove 96. The radially extending yoke member 34 is pivotally mounted at one end 40 by way of a pivot mount 42. At its opposite end 36, radially extending member 34 is pivotally engaged with lever 32 by way of pivot pins 48 and an intermediate linkage member 46. Linkage member 46 is pivotally attached to lever 32 by way of pivot pins 49. Thus, as particularly illustrated in FIG. 2a, axial movement of lever member 32 causes radially extending member 34 to pivot at pivot mount 42. Linkage member 46 permits the pure axial movement of lever member 32 to be transferred to member 34. As member 34 pivots, pins 38 engaging within chuck device 12 also have an axial movement component. This axial movement component is sufficient to move chuck device 12 between its gripping and release positions.

It should be appreciated that any number of mechanical linkages or configurations may be utilized to transfer axial movement of lever member 32 to chuck device 12, and that the embodiment illustrated in FIGS. 1 and 2 is merely an example of one particularly preferred embodiment.

Figure 2A:
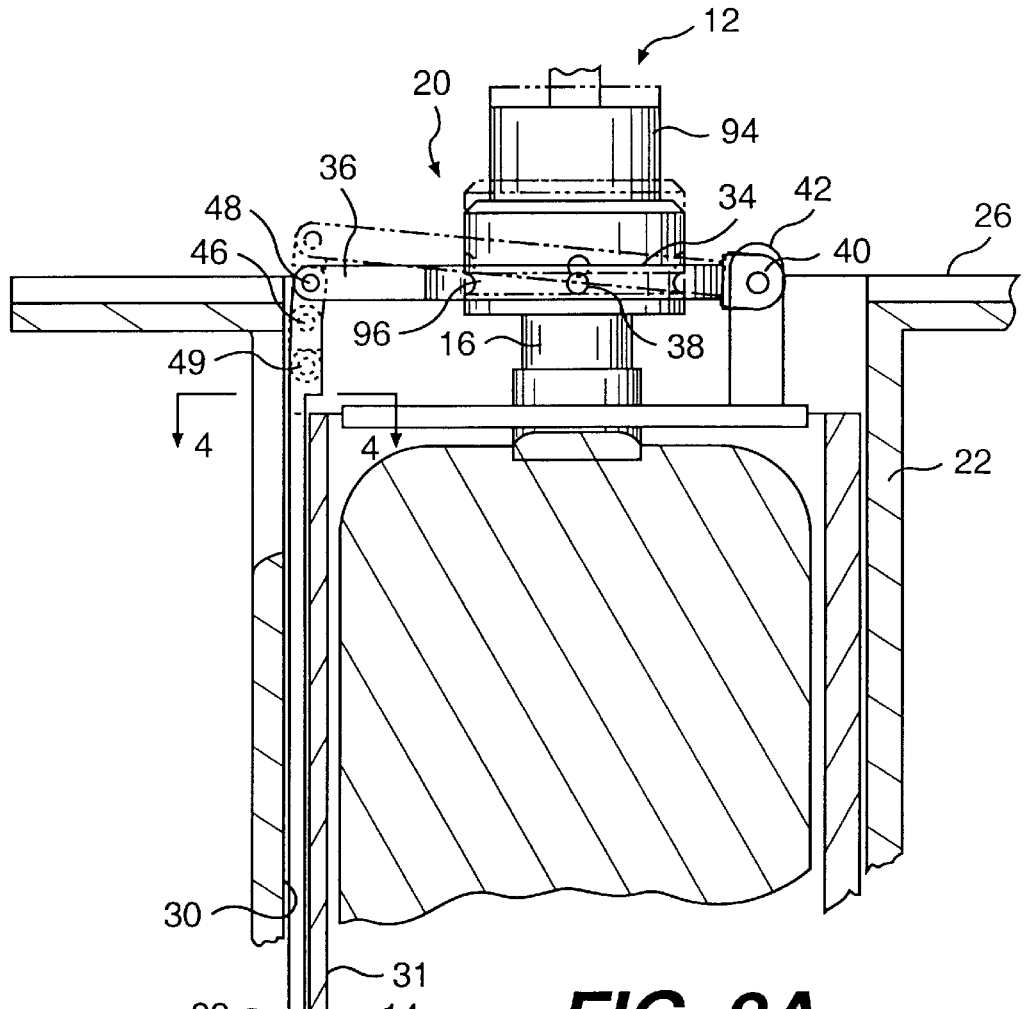
FIG. 2a is a cross-cut view of the router shown in FIG. 1 taken along the lines indicated.
Figure 2B:
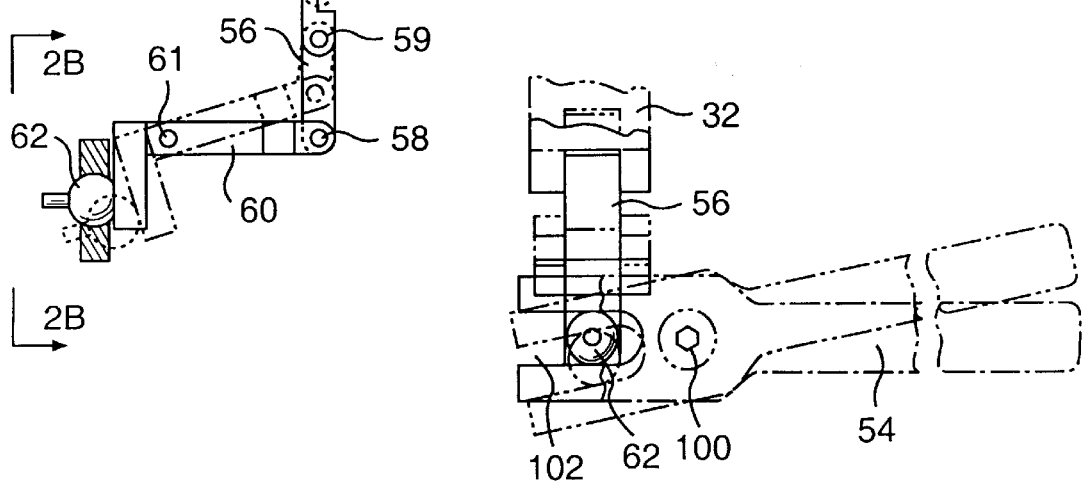
FIG. 2b is a perspective operational view of the embodiment of FIG. 2a taken along the lines indicated.

The present invention also preferably includes an actuating arm, generally 54, that is manually operable to impart axial movement to lever 32. In the embodiment illustrated in FIGS. 1 and 2, actuating arm 54 is generally rotatable relative to lever 32. Arm 54 is rotatably mounted via pivot mount 100 to a frame or housing member 98. Arm 54 includes an elongated slot 102 defined in the end thereof. A ball joint 62 resides within slot 102 and is connected to a radially extending linkage member 60 which is pivotally mounted at pivot point 61. Linkage member 60 is also connected to lever 32 by way of linkage member 56 and pivots 58, 59. The operation of this particular embodiment is illustrated in FIGS. 2a and 2b. As an operator manually grasps handle 54 and pulls the handle upward, as illustrated in FIG. 2b, ball joint 62 is driven downwards and the opposite end of linkage member 60 is driven upwards. This upward movement is transferred to lever 32 by way of linkage 56.

It may also be preferred to incorporate some sort of locking device or mechanism, such as the simple latch 104 illustrated in FIG. 1, to ensure that arm 54 is maintained in its gripping position. In this regard, any conventional latching or securing device may be utilized.

Lever member 32 is disposed within the inner circumference 30 of base member 22 so as not to interfere with rotational movement of the base member, as explained above. In many situations, to accomplish this feature, lever 32 will need to pass into the bottom casing or housing member of the router and arm 54 will need to extend through an opening, generally 103, defined in the housing or casing. In the embodiment illustrated, frame member or structure 98 is added to the bottom of the router housing in order to support the actuating mechanism. It should be appreciated that any manner of additional structure or supporting members may be utilized in this regard depending on the type of actuating device utilized and configuration of the power tool.

Figures 3A, 3B:
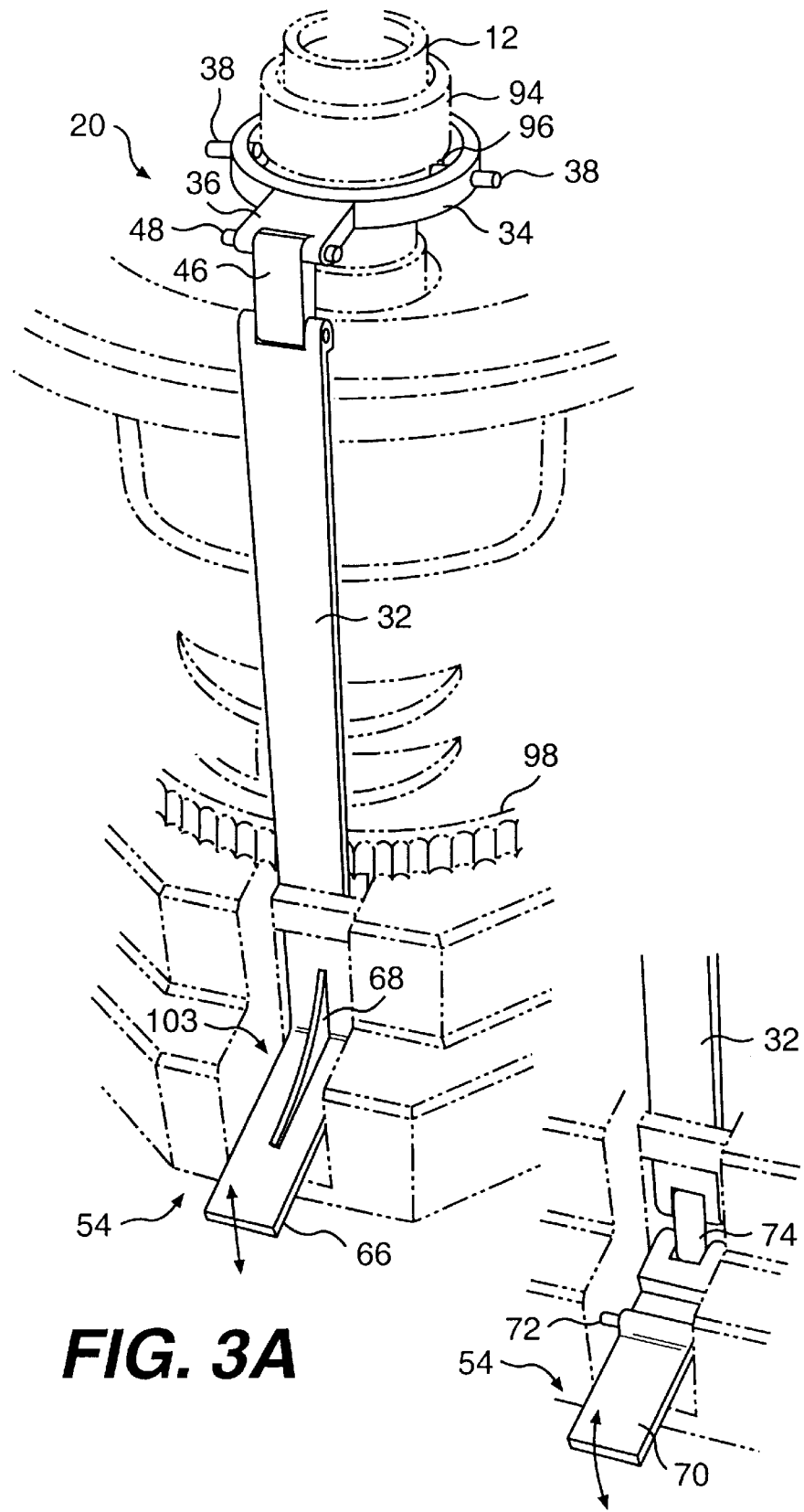
FIG. 3a is a partial perspective view of an alternative embodiment of the actuating device according to the present invention.
FIG. 3b is a partial perspective view of still an alternative embodiment of the actuating device according to the invention.

Alternative embodiments of the actuating device 20 are illustrated in FIGS. 3a and 3b. In these embodiments, lever member 32 is actuated by a generally perpendicularly extending actuating arm 54. In the embodiment of FIG. 3a, arm 54 is a rigid member 66 that is rigidly fixed to lever 32 by way of brace 68. This device is actuated by the operator simply grasping arm 66 and moving arm 66 up or down. In the embodiment of FIG. 3b, arm 54 is a pivotally mounted arm 70. Arm 70 is mounted to the housing or support structure 98 by way of pivot pin 72. Arm 70 is pivotally connected to lever 32 by way of linkage 74 and its respective pivots. In this embodiment, the operator depresses or raises arm 70 causing opposite axial movement to be imparted to lever member 32.

Figure 6:
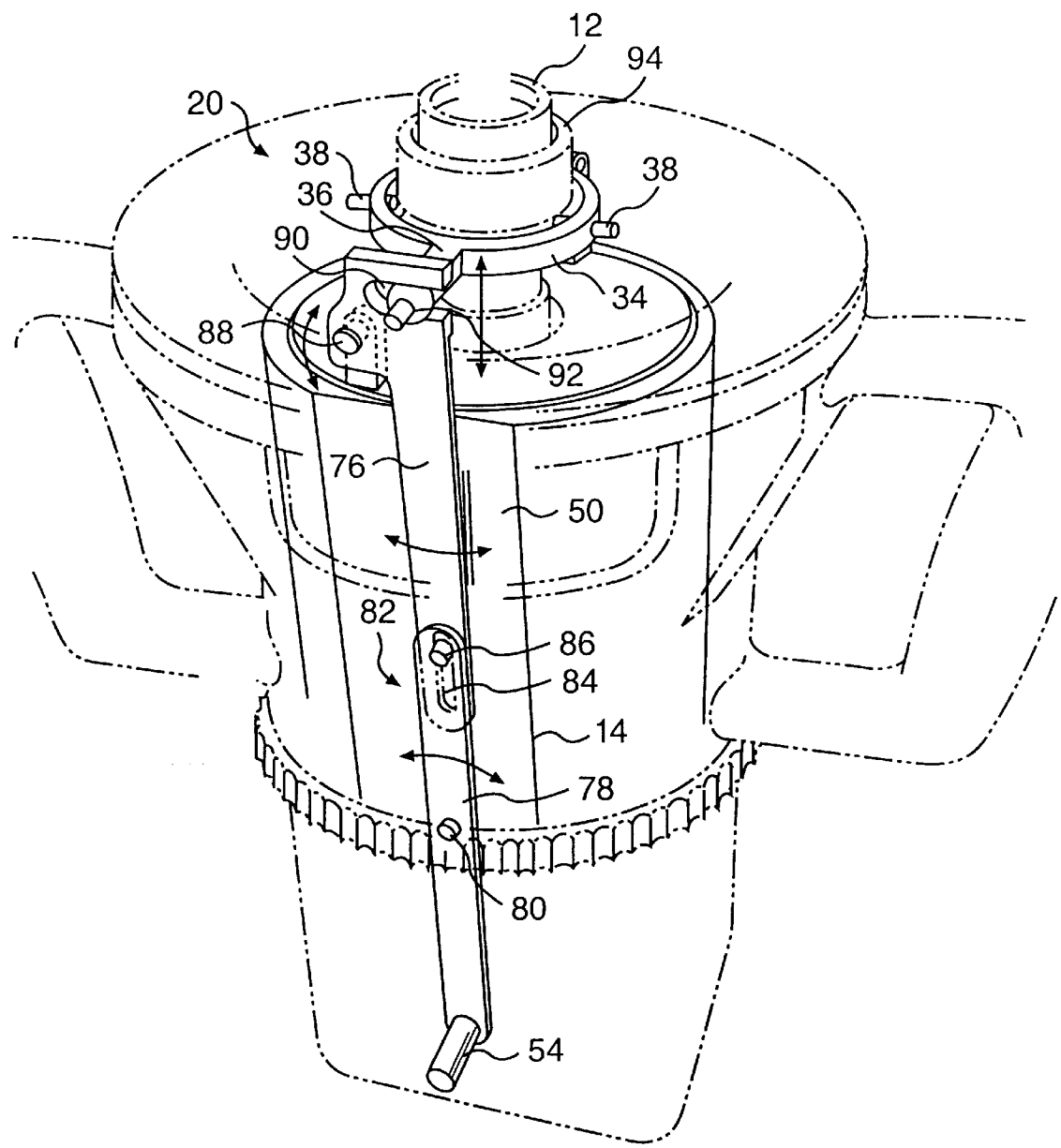
FIG. 6 is a partial perspective view of still an alternative embodiment of a lever mechanism according to the invention.

Another preferred embodiment of the actuating device is illustrated in FIG. 6. In this embodiment, the lever member is comprised of a first lever member 76 and a second lever member 78. Lever members 76 and 78 extend axially in channel 50. However, channel 50 has a relatively wide width as compared to the width of lever members 76, 78. In this embodiment, levers 76 and 78 are not moved axially so much as they are rotated to impart axial movement to chuck 12. This device is actuated by the operator grasping the lower lever member 78, for example at actuator arm 54 and moving arm 54 sideways. Second lever member 78 is pivotally mounted at pivot point 80 relative to casing 14 and is pivotally engaged with first lever member 76 by way of pivot pin 86 engaged within slot 84. This arrangement allows for a relatively wide range of movement of the lever arms within channel 50. For example, if arm 50 is swung to the left, the bottom of lever arm 76 engaged with lever arm 78 is swung to the right. The upper half of lever arm 76 is pivotally mounted to the casing by way of pivot mount 88. A slot 90 defined in lever 76 engages a ball joint 92 configured on the end 36 of radially extending member 34. Accordingly, as the lower end of lever 76 is swung to the right, ball joint 92 is pivoted upwards and, thus, radially extending member 34 causes chuck 12 to move axially to its release position by way of pins 38 engaging within groove 96. Opposite movement of arm 54 causes the reverse operation and chuck 12 moves to its gripping position. As mentioned above, a locking mechanism may be incorporated with any of the embodiments illustrated and described herein.

It should be appreciated by those skilled in the art that various modifications and variations can be made in the present invention without departing from the scope or spirit of the invention. For example, any number of mechanical linkages or configurations may be utilized to impart axial movement to the chuck device from movement of the lever relative to the casing, regardless of whether the lever movement is axial or rotational. It is intended that the present invention include such modifications and variations as come within the scope of the appended claims and their equivalents.

What is claimed is:

1. A rotary power tool having a remotely actuated chuck device, said power tool comprising:

a casing housing a rotationally driven drive spindle;

a chuck device attached to an end of said drive spindle, said chuck device movable between a gripping position wherein said chuck device clamps upon a tool held therein, and a release position wherein said chuck device releases a tool held therein;

an actuating device operably engaged with said chuck device to move said chuck device between said gripping and release positions;

a base concentric on said casing, said base comprising a variably positionable upper working surface establishing a working position of said tool held by said chuck device relative to a work piece, said base rotatably advanceable on said casing for changing positions of said working surface relative to an axis of said drive spindle; and wherein said actuating device further comprises a lever member extending axially relative to said casing within an inner circumference of said base, said lever member movable relative to said casing to move said chuck device between said gripping and release positions with said base being freely rotatable relative to said casing without interference from said lever member.

2. The rotary power tool as in claim 1, wherein said actuating device comprises a radially extending member engaged with said chuck device and engaged with said lever member at an end thereof, said lever member movable axially along said casing to move said radially extending arm member.

3. The rotary power tool as in claim 2, wherein said lever member is disposed within an axially extending channel defined in an outer circumferential surface of said casing.

4. The rotary power tool as in claim 2, wherein said lever member is pivotally attached to said radially extending member.

5. The rotary power tool as in claim 2, further comprising an actuating arm member operably configured with said lever member at an end thereof opposite from said radially extending member.

6. The rotary power tool as in claim 5, wherein said actuating arm member is rotatable relative to said lever member, and further comprising a joint mechanism disposed between said actuating arm member and said lever member to convert rotational movement of said actuating arm to axial movement of said lever member.

7. The rotary power tool as in claim 5, wherein said actuating arm member is pivotal relative to said lever member, and further comprising a joint mechanism disposed between said actuating arm member and said lever member to convert pivotal movement of said actuating arm member to axial movement of said lever member.

8. The rotary power tool as in claim 2, wherein said actuating arm is rigidly fixed relative to said lever member.

9. The rotary power tool as in claim 1, wherein said chuck device comprises an outer axially movable sleeve, said actuating device comprising a radially extending member engaged with said sleeve member.

10. The rotary power tool as in claim 1, wherein said power tool is a router.

11. The rotary power tool as in claim 1, wherein said lever member extends axially within an inner circumferential surface of said casing.

12. The rotary power tool as in claim 11, wherein said actuating device comprises an actuating arm configured on an end of said lever member opposite from said chuck device, said actuating arm extending from said lever member through an opening in said casing.

13. The rotary power tool as in claim 1, wherein said actuating device comprises a pivotally mounted radially extending member engaged with said chuck device at one end and engaged with said lever member at an opposite end, said lever member rotatable relative to said radially extending member, and further comprising a joint mechanism operably configured between said lever member and said radially extending member to convert rotational movement of said lever member to pivotal movement of said radially extending member.

14. The rotary power tool as in claim 13, wherein said chuck device comprises an outer axially moveable sleeve member, said radially extending member engaged at one end thereof with said sleeve member and pivotally mounted adjacent said opposite end thereof wherein pivotal movement of said radially extending member imparts axial movement to said sleeve member.

15. The rotary power tool as in claim 1, further comprising a locking mechanism configured to lock said actuating device in a position to keep said chuck device in said gripping position.

16. A rotary power tool having a remotely actuated chuck device, said power tool comprising:

a casing housing a rotationally driven drive spindle;

a chuck device attached to an end of said drive spindle, said chuck device comprising an outer sleeve member axially movable between a gripping position wherein said chuck device clamps upon a tool held therein, and a release position wherein said chuck device releases a tool held therein;

a base concentric on said casing, said base comprising a variably positionable upper working surface establishing a working position of said tool held by said chuck device relative to a work piece, said base axially adjustable on said casing for changing positions of said working surface relative to an axis of said drive spindle;

an actuating device having a first member engaged with said outer sleeve member and extending generally radially outward from said chuck device, said first member movable in a direction so as to move said outer sleeve member between said gripping position and said release position; and said actuating device further comprising a lever member engaged with said first member and extending generally axially relative to said casing so that said base is movable relative to said casing without interference from said lever member, said lever member movable relative to said casing wherein movement of said lever member is imparted to said first member.

17. The rotary power tool as in claim 16, wherein said lever member is movably disposed within an axially extending channel defined in an outer circumferential surface of said casing.

18. The rotary power tool as in claim 16, wherein said lever member is movable axially relative to said casing.

19. The rotary power tool as in claim 16, wherein said lever member is rotatable relative to said first member.

20. The rotary power tool as in claim 19, wherein said lever member is movably disposed within an axially extending channel defined in said casing.

* * * * *